US005573187A

United States Patent [19]

Proctor

[11] Patent Number: 5,573,187

[45] Date of Patent: Nov. 12, 1996

[54] SPRAYING APPARATUS AND METHOD FOR CLEANING HOLDING TANKS OF RECREATIONAL VEHICLES AND OTHER VEHICLES WITH A COMMODE

[76] Inventor: Ronnie E. Proctor, P.O. Box 1423, High Point, N.C. 27261

[21] Appl. No.: 342,728

[22] Filed: Nov. 21, 1994

[51] Int. Cl.$^6$ .......... B60B 9/02

[52] U.S. Cl. .......... 239/532; 134/167 R; 134/167 C; 138/118

[58] Field of Search .......... 134/167 C, 167 R, 134/172, 166 R, 166 C, 179, 180, 190, 178, 168 C; 239/588, 532; 138/104, 118

[56] References Cited

U.S. PATENT DOCUMENTS

| | | | |
|---|---|---|---|
| D. 287,993 | 1/1987 | Crow . | |
| D. 294,965 | 3/1988 | Garrard et al. . | |
| D. 315,780 | 3/1991 | Hengesbach . | |
| D. 317,967 | 7/1991 | Pelletier | D23/223 |
| 1,067,891 | 7/1913 | Wagner . | |
| 1,803,425 | 5/1931 | Cunningham . | |
| 3,536,263 | 10/1970 | Parker . | |
| 3,908,208 | 9/1975 | McIlroy | 138/118 |
| 4,030,513 | 6/1977 | McKenzie | 134/167 R |
| 4,031,910 | 6/1977 | Lawson . | |
| 4,054,149 | 10/1977 | Nelson . | |
| 4,114,812 | 9/1978 | Austin et al. | 239/532 |
| 4,182,497 | 1/1980 | Ferreira et al. | 134/167 C |
| 4,216,910 | 8/1980 | Kimbrough . | |
| 4,304,498 | 12/1981 | George . | |
| 4,319,851 | 3/1982 | Arthur . | |
| 4,349,039 | 9/1982 | Egger . | |
| 4,550,453 | 1/1985 | Norman . | |
| 5,022,586 | 6/1991 | Putnam . | |
| 5,203,361 | 4/1993 | Tickle . | |
| 5,421,904 | 6/1995 | Carlson | 134/167 C |

FOREIGN PATENT DOCUMENTS

| | | | |
|---|---|---|---|
| 665506 | 5/1929 | France | 239/532 |

*Primary Examiner*—Matthew C. Graham

*Attorney, Agent, or Firm*—Rhodes Coats & Bennett, L.L.P.

[57] ABSTRACT

A hand-held spraying apparatus for cleaning a holding tank in vehicles having a commode such as recreational vehicles. The spraying apparatus comprises a conduit having a valve for starting, stopping or regulating fluid flow through the apparatus; a viewport connected to the distal end of the conduit; an extended tube having first and second ends with the first end connected to the viewport and an elbow positioned near the second end; and a spray nozzle positioned at the second end of the extended tube and having openings positioned radially about the shaft portion of the spray nozzle so as to produce a circumferential spray pattern. A method for cleaning a holding tank is also disclosed.

11 Claims, 1 Drawing Sheet

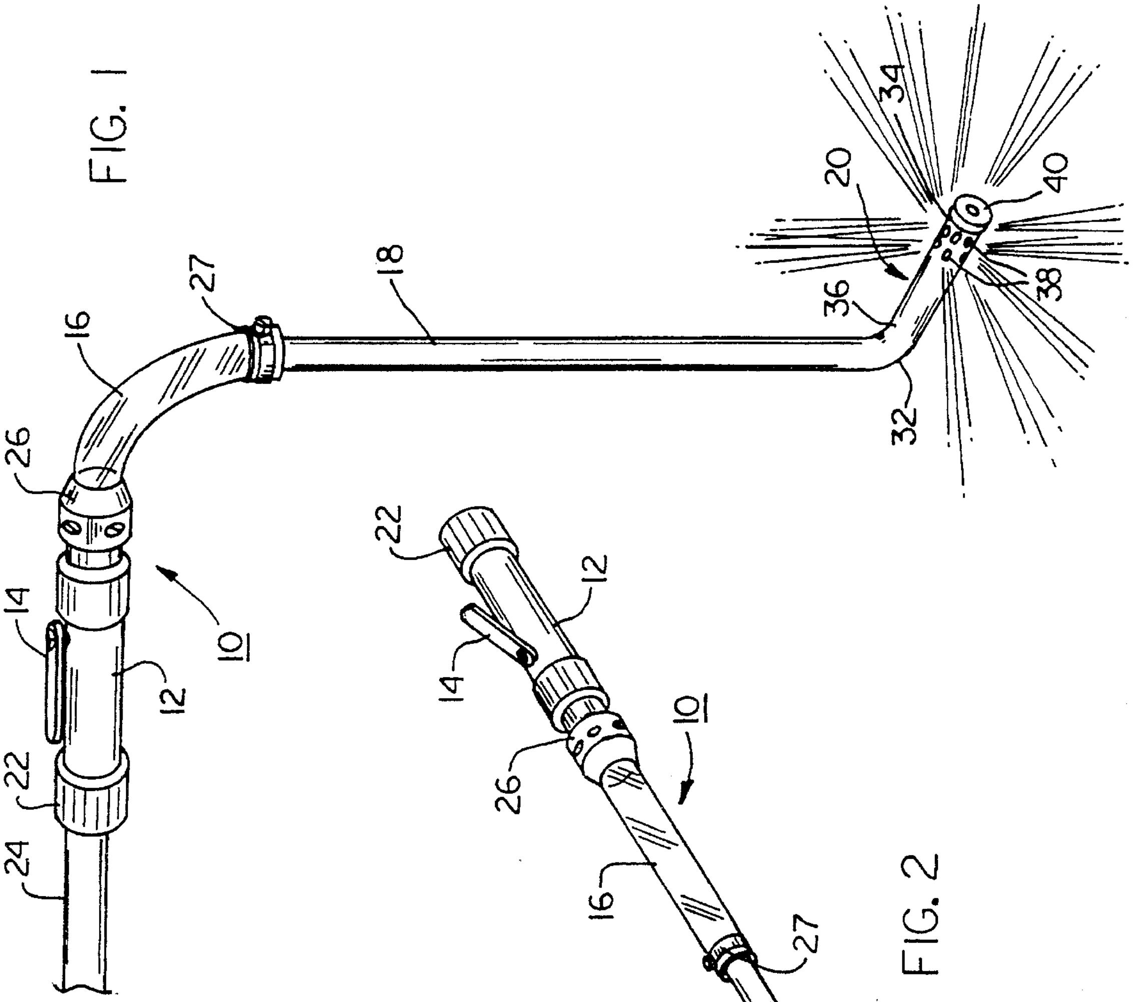
FIG. 1
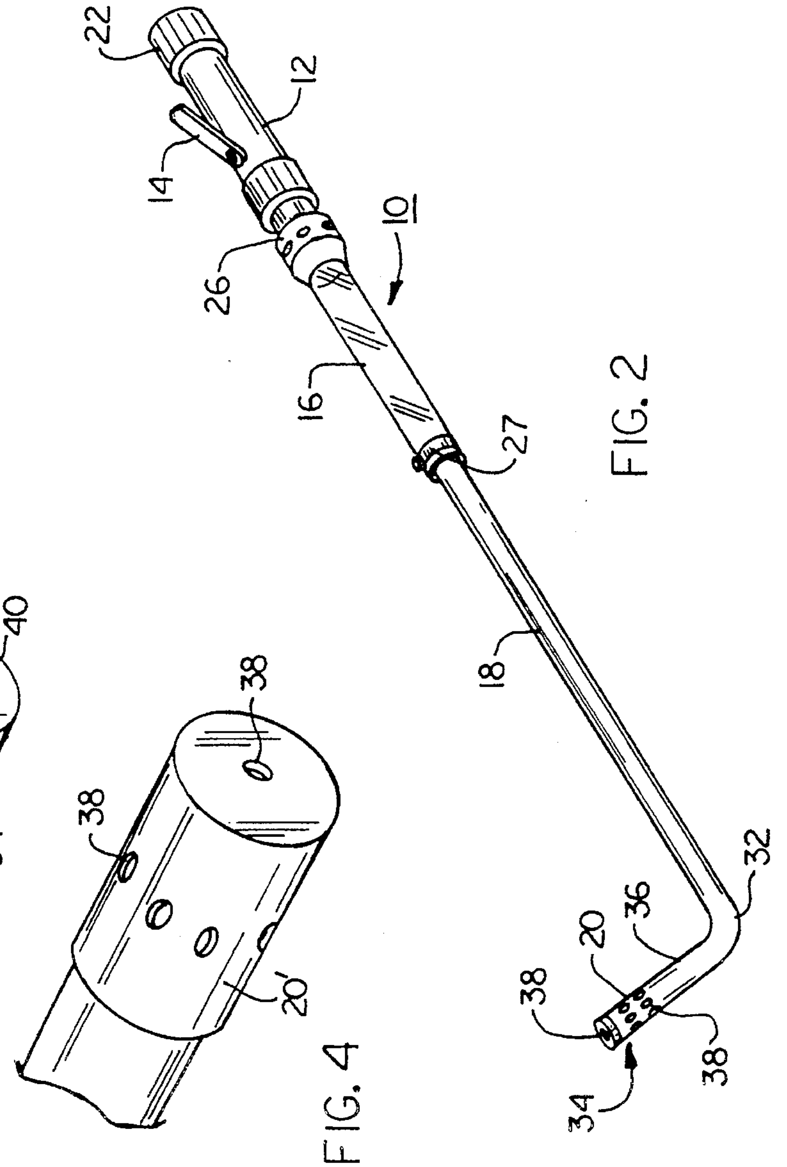
FIG. 2
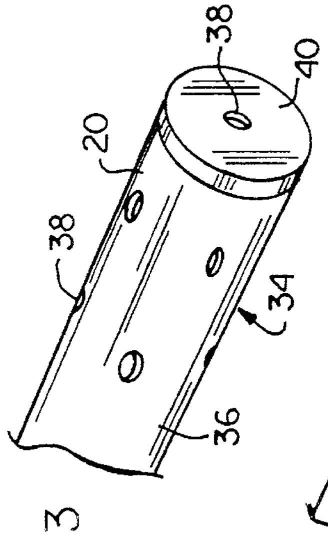
FIG. 3
FIG. 4

SPRAYING APPARATUS AND METHOD FOR CLEANING HOLDING TANKS OF RECREATIONAL VEHICLES AND OTHER VEHICLES WITH A COMMODE

BACKGROUND OF THE INVENTION

The present invention relates to an apparatus and method for cleaning holding tanks in vehicles with a commode. More particularly, the present invention relates to a flexible hand-held sprayer for cleaning holding tanks in recreational vehicles.

Recreational vehicles like campers, motorhomes, trailers and the like are typically outfitted with a holding tank in which waste materials from the self-containing commode are stored until released into a sewer or septic system. Emptying the holding tank, which usually has about a 40–50 gallon capacity, into sewer facilities at recreational vehicle parks is considered one of the least desirable chores associated with camping. Typically, a long and dirty water hose is connected from a water supply, brought inside the recreational vehicle, and then inserted down inside the commode. Through the commode, the holding tank is filled with water. The contents of the tank are then drained into a sewer system using a sewer hose, which is fitted to the outlet of the holding tank and the inlet for the sewer. Removal of the waste materials from the holding tank in this manner often leaves waste remaining on the walls of the holding tank. Trapped waste generates offensive odors, which can permeate the interior of the recreational vehicle.

Several devices have been developed for removing waste materials from recreational vehicles. In this regard, U.S. Pat. No. 4,550,453 (Norman) discloses a compact and portable drain which facilitates sewage disposal and subsequent flushing and cleaning of a holding tank in a recreational vehicle. However, the drain is located exteriorly to the vehicle. U.S. Pat. No. 5,203,361 (Tickle) discloses an apparatus for cleaning and storing sewer hoses that are used to discharge the contents of holding tanks of recreational vehicles.

Similarly, U.S. Pat. No. 4,054,149 (Nelson) discloses an apparatus for cleaning and storing a recreational vehicle sewer hose. U.S. Pat. No. Design 317,967 (Pelletier) illustrates a spray wand for disinfecting and deodorizing holding tanks in recreational vehicles. However, none of the prior art devices provides an efficient and effective means for thoroughly cleaning all surfaces of the holding tank in recreational vehicles. The water supplying hose, as is currently used, cannot be manipulated inside the holding tank to effectively clean the side walls and to eliminate all remaining waste materials. A more flexible cleaning device is needed to address this problem.

SUMMARY OF THE INVENTION

The present invention is directed to a hand-held spraying apparatus suitable for cleaning holding tanks in vehicles having a commode, in particular recreational vehicles. The sprayer comprises a conduit having a valve for starting, stopping or regulating fluid flowing through the apparatus; a viewport connected to the distal end of the conduit by an adapter; an extended tube having first and second ends with the first end connected to the viewport by a connector and at the second end, a spray nozzle is positioned. An elbow is also positioned near the second end of the extended tube. The spray nozzle comprises a nozzle member including a cylindrical shaft portion having one end open to receive a flow of fluid; openings positioned radially about the shaft portion so as to produce a circumferential spray pattern; and an end cap enclosing the other end opposite the open end to prevent axial flow.

The present invention is also directed to a method for cleaning a holding tank in a vehicle having a commode. In this regard, the hand-held spraying apparatus as described in accordance with the present invention is inserted down through the commode and into the holding tank. A fluid is then supplied through the apparatus so as to clean the holding tank and related piping.

The sprayer of the present invention has several advantages. First, the overall design of the sprayer significantly reduces the amount of time required to clean the holding tank of a recreational vehicle. With the sprayer, a water supply conduit such as a garden hose is connected to the fitting on the conduit of the sprayer. The sprayer is inserted down through the vehicle's commode and into the holding tank at which time the valve on the conduit is turned to the "on" position and the fluid begins to flow through the elongated tube and down into the holding tank. The viewport allows the user to see the flow of fluid through the tube, and provides a means by which adjustments can be made to regulate the fluid flow.

Second, the sprayer provides a further advantage in its flexibility. In this regard, the sprayer can be moved up and down in the holding tank, and the radially positioned openings in the spray nozzle allow the fluid to be sprayed in all directions, thereby covering all of the surfaces within the holding tank. When the user is finished cleaning the holding tank, the valve is set in the "off" position and the sprayer is easily removed, eliminating the residual waster material that typically remains with conventional hose-type cleaning devices.

In a preferred embodiment, the viewport comprises transparent plastic tubing.

In another embodiment, the extended tube is opaque.

In yet another embodiment, at the second end of the extended tube, a spray nozzle is positioned.

In one embodiment, the number of openings in the spray nozzle ranges between about 4 to about 8.

In another embodiment, the size of the openings of the spray nozzle ranges between about ⅛ inch to about ¼ inch. Preferably, the opening size is 3⁄16 inch.

In a further embodiment, the openings of the spray nozzle are radially spaced between about 45° and 90°.

Additional features and advantages are described in and will be apparent from the detailed description of the presently preferred embodiments and from the drawings.

BRIEF DESCRIPTION OF THE DRAWINGS

FIG. 1 is a perspective view of the spraying apparatus.

FIG. 2 is a side perspective view of the spraying apparatus.

FIG. 3 is an enlarged perspective view of the spray nozzle of the apparatus of the present invention.

FIG. 4 is an alternative embodiment of the spray nozzle of the spraying apparatus.

DETAILED DESCRIPTION OF THE PREFERRED EMBODIMENTS

As illustrated in FIG. 1, the spraying apparatus 10 of the present invention comprises an assembly of components: a conduit 12 having a valve 14, a viewport 16, an extended tube 18, and a spray nozzle 20. The conduit 12 is provided with an attaching means 22 so that the conduit is capable of being removably connected to a fluid supply conduit 24, for example, a garden hose. Typically, water is used to clean the holding tank of a vehicle having a commode.

The valve 14 of the conduit 12 starts, stops or regulates the flow of fluid through the spraying apparatus 10 and into the holding tank. The viewport 16 is connected to the distal end of the conduit 12 by adapter 26, and allows the user of the spraying apparatus 10 to see the flow of water or fluid entering the holding tank as well as to gauge the pressure of the fluid. The viewport 16 comprises transparent material, preferably plastic tubing, and thus, provides flexibility to the overall apparatus of the invention. The length of the viewport 16 is not critical, but may be approximately 4 to about 8 inches in length with a preferred length of about 5 inches. The viewport 16 may be a separate component of the spraying apparatus or, alternatively, may be an integral part of the extended tube 18.

The extended tube 18 is opaque in its composition. The length of tube 18 may vary, but in one embodiment, the length ranges between approximately 17 inches to about 21 inches with a preferred length of approximately 19½ inches. Like the viewport 16, the diameter of the extended tube 18 is not critical, however, a diameter of approximately ⅝ inches has been found to provide adequate flow through the spraying apparatus 10. Extended tube 18 has first and second ends with the first end connected to the viewport 16 by a cormector 27. An elbow 32 is positioned near the second end of extended tube 18. The elbow 32 is preferably 90°, but can be any angle capable of allowing the fluid from the sprayer to effectively clean the holding tank and related piping.

As shown in FIG. 1, at the second end of extended tube 18, a spray nozzle 20 is positioned. The spray nozzle 20 is designed for use in cleaning the interior of a holding tank in a recreational vehicle, and comprises a nozzle member 34 including a cylindrical shaft portion 36 having one end open to receive the fluid flow; openings 38 which are positioned radially about the shaft portion 36 of the spray nozzle 20 so as to produce a circumferential spray pattern; and an end cap 40 which encloses the other end opposite the open end to prevent axial flow. The number of openings can vary, but the preferred number ranges between about 4 to about 8. With respect to the shape of the openings 38, although the openings illustrated in FIGS. 1–4 are round, the shape can vary. The size of the openings range between about ⅛ inch to about ¼ inch with a preferred size of 3/16 inch. The openings are spaced circumferentially about the shaft 36 with approximate radial spacing of between about 45° and about 90°. The spray nozzle 20 is permanently attached to the extended tube 18 as shown in FIGS. 1 and 2. Alternatively, the spray nozzle 20' may be removably connected to the extended tube 18 as shown in FIG. 4 by an attaching means.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A spraying apparatus for cleaning holding tanks with a commode, comprising:

a conduit having a valve for controlling fluid flow;

a viewport connected to the distal end of the conduit by a connector;

an extended tube having first and second ends with the first end connected to the viewport by a connector, and an elbow positioned near the second end; and a radial spray nozzle positioned at the second end of the extended tube and comprising: a nozzle member including a cylindrical shaft portion having one end open to receive a flow of fluid; openings positioned radially about the shaft portion so as to produce a circumferential spray pattern; and an end cap enclosing the other end opposite the open end to limit axial flow.

2. The spraying apparatus of claim 1, wherein the conduit is capable of being removably connected to a fluid supply conduit.

3. The spraying apparatus of claim 1, wherein the viewport comprises transparent material.

4. The spraying apparatus of claim 3, wherein the transparent material is plastic tubing.

5. The spraying apparatus of claim 1, wherein the viewport is flexible.

6. The spraying apparatus of claim 1, wherein the extended tube is opaque.

7. The spraying apparatus of claim 1, wherein the nozzle member is permanently attached to a fluid supply conduit.

8. The spraying apparatus of claim 1, wherein the nozzle member is removably attached to a water supply conduit.

9. The spraying apparatus of claim 1, wherein the number of openings ranges between about 4 to about 8.

10. The spraying apparatus of claim 1, wherein the size of the openings ranges between about ⅛ inch to about ¼ inch.

11. The spraying apparatus of claim 1, wherein the openings have a radial spacing between about 45° and 90°.

* * * * *